United States Patent
Su

(10) Patent No.: US 9,392,512 B2
(45) Date of Patent: Jul. 12, 2016

(54) MULTIPLE CELL MEASUREMENT AND DATA RECEPTION IN A WIRELESS COMMUNICATION DEVICE

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 13/939,970

(22) Filed: Jul. 11, 2013

(65) Prior Publication Data

US 2015/0016282 A1  Jan. 15, 2015

(51) Int. Cl.
*H04W 36/00* (2009.01)
*H04W 24/10* (2009.01)

(52) U.S. Cl.
CPC .......... *H04W 36/0088* (2013.01); *H04W 24/10* (2013.01)

(58) Field of Classification Search
CPC ....... H04L 47/10; H04L 43/50; H04W 64/00; H04W 88/02; H04W 24/00
See application file for complete search history.

(56) References Cited

U.S. PATENT DOCUMENTS

| | | | |
|---|---|---|---|
| 8,326,301 B2 | 12/2012 | Park et al. | |
| 8,358,629 B2 * | 1/2013 | Grilli et al. | 370/332 |
| 8,358,982 B2 | 1/2013 | Van Der Velde et al. | |
| 8,441,951 B2 | 5/2013 | Kazmi et al. | |
| 8,451,803 B2 | 5/2013 | Kitazoe | |
| 8,750,807 B2 * | 6/2014 | Lin et al. | 455/67.11 |
| 2011/0319070 A1 | 12/2011 | Nosley et al. | |
| 2012/0115459 A1 * | 5/2012 | Deng et al. | 455/422.1 |
| 2012/0263054 A1 * | 10/2012 | Kazmi et al. | 370/252 |
| 2013/0065612 A1 * | 3/2013 | Siomina et al. | 455/456.2 |

* cited by examiner

*Primary Examiner* — Andrew Lai
*Assistant Examiner* — Chuong M Nguyen
(74) *Attorney, Agent, or Firm* — Downey Brand LLP

(57) ABSTRACT

Methods, apparatuses and computer readable media are described that configure wireless circuitry of a wireless communication device connected to a wireless network. Processing circuitry in the wireless communication device establishes a connection to a access network subsystem of the wireless network using a plurality of radio frequency carriers and provides an indication of wireless circuitry included therein. The wireless network provides a measurement gap configuration, and the wireless communication device suspends communication on at least one carrier and measures signals from one or more additional access network subsystems during a measurement gap time period. The wireless communication device provides a measurement report to the access network subsystem based at least in part on measured signals. In an embodiment, the wireless communication device also receives downlink communication from the wireless network during at least a portion of the measurement gap time period.

18 Claims, 10 Drawing Sheets

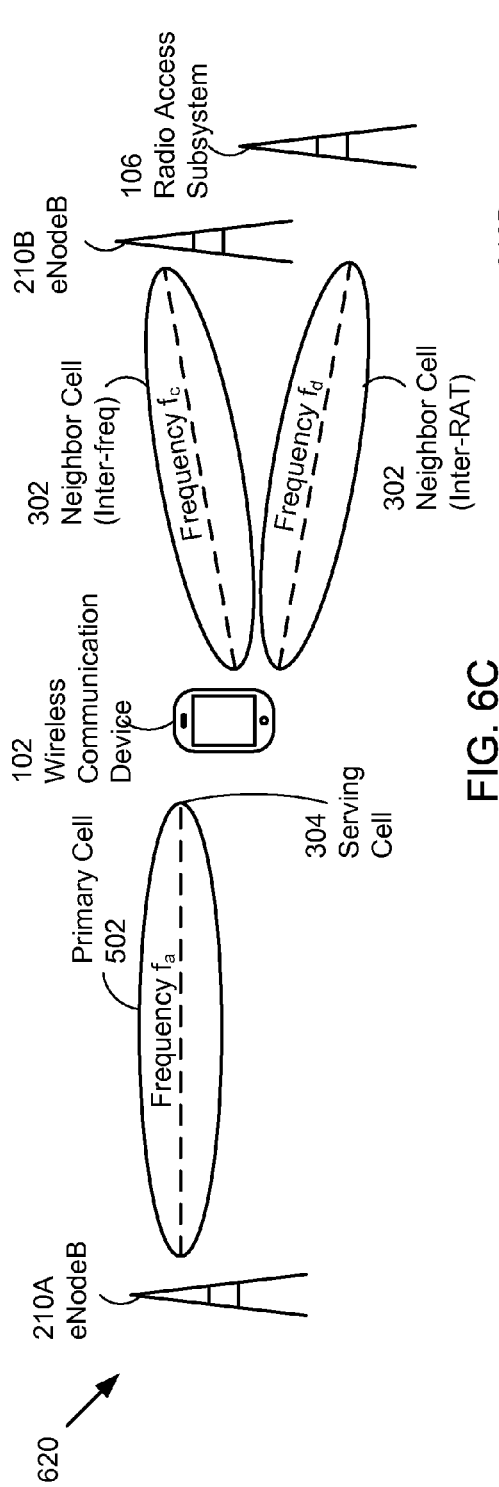
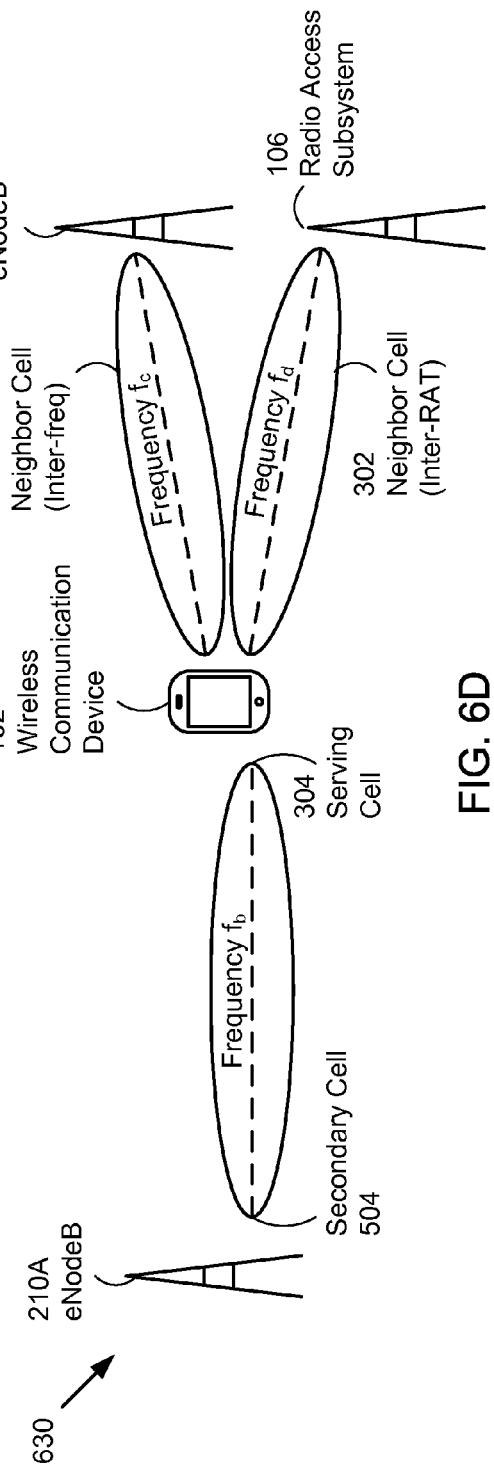
FIG. 6C
FIG. 6D

MULTIPLE CELL MEASUREMENT AND DATA RECEPTION IN A WIRELESS COMMUNICATION DEVICE

TECHNICAL FIELD

The described embodiments generally relate to methods and apparatuses for cell measurements by a wireless communication device. More particularly, the present embodiments describe configuring a connection between the wireless communication device and an access network subsystem to provide for measuring multiple cells simultaneously and for measuring at least one cell and receiving data from another cell simultaneously.

BACKGROUND

Wireless communication devices continue to evolve to provide users with higher data throughput based on newer generation wireless communication protocols using various radio access technologies, and to provide users with increased functionality integrating various features in a multi-capable device. A wireless communication device can include support for a Third Generation Partnership Project (3GPP) Long Term Evolution (LTE) wireless communication protocol, e.g. LTE Releases 8 and 9, current LTE-Advanced (also referred to as LTE-A) Releases 10 and 11, and future LTE-Advanced (also referred to as LTE-B) Releases 12 and beyond. Higher data throughput provided by an access network subsystem (e.g., an evolved Node B, also referred to as an eNodeB or eNB) of an LTE/LTE-Advanced wireless network to a wireless communication device can be boosted at least in part by using multiple carriers simultaneously in a configuration known as carrier aggregation. The wireless communication device can include radio frequency (RF) wireless circuitry that provides for simultaneous reception of RF signals from two or more cells of the eNodeB, each cell using a different RF carrier centered at a different frequency. For mobile wireless communication devices, RF communication channel characteristics can vary as the wireless communication device moves within and through different cells of the LTE/LTE-Advanced wireless network (as well as through overlapping cells of wireless networks that use alternative radio access technologies (RATs), e.g., 3GPP Global System for Mobile Communications (GSM) wireless networks, 3GPP Universal Mobile Telecommunications System (UMTS) wireless networks, and/or 3GPP2 Code Division Multiple Access (CDMA) wireless networks.) The wireless communication device can be configured by the eNodeB of the LTE/LTE-Advanced wireless network to stop reception of downlink signals from the eNodeB, either periodically or a-periodically, and to measure signals received from other cells that use radio frequency carriers different from the cells of the eNodeB currently serving the wireless communication device. This gap in data reception from the serving cells of the eNodeB can be referred to as a "measurement gap" during which the wireless communication device can measure cells that use carriers on other frequencies (inter-freq measurements) and also measure cells that use other radio access technologies (inter-RAT measurements).

Wireless communication devices that do not support carrier aggregation, e.g., that include wireless circuitry for only one RF carrier, necessarily can listen to only one cell at a time, and thus downlink data reception from an associated eNodeB need be halted during the measurement gaps to permit signal reception from another cell using a different RF carrier. Present versions of the 3GPP LTE-Advanced wireless communication protocols specify that data reception on all carriers provided to a wireless communication device that uses carrier aggregation for reception on multiple carriers simultaneously be halted for all carriers during the measurement gap time period, thereby allowing for an RF signal chain in the wireless communication device to be tuned to another RF carrier to listen for and measure received signals used for measurement reporting to the eNodeB. For a wireless communication device having multiple RF signal chains that can receive data and/or listen and measure signals from multiple cells simultaneously, using only one RF signal chain during a measurement gap time period can idle RF wireless circuitry that could otherwise be used for parallel signal reception and/or measurement. Thus, multiple cell measurement and data reception in wireless communication devices can be improved upon.

SUMMARY OF THE DESCRIBED EMBODIMENTS

Broadly speaking, the described embodiments generally relate to methods and apparatuses for cell measurements by a wireless communication device. More particularly, the present embodiments describe configuring a connection between the wireless communication device and an access network subsystem to provide for measuring multiple cells simultaneously and for measuring at least one cell and receiving data from another cell simultaneously.

In an embodiment, a method to configure wireless circuitry, during one or more measurement gap time periods, in a wireless communication device connected to a long term evolution (LTE) wireless network is described. The method comprises one or more of the following steps. In a step, the wireless communication device establishes a connection that uses a plurality of carriers simultaneously for carrier aggregation between the wireless communication device and a access network subsystem of the LTE wireless network. In another step, the wireless communication device provides an indication of a number of parallel radio frequency receive signal chains included in wireless circuitry of the wireless communication device to the access network subsystem of the LTE wireless network. In a further step, the wireless communication device obtains a measurement gap configuration from the access network subsystem of the LTE wireless network. When the measurement gap configuration indicates at least one carrier in the plurality of carriers is usable for downlink communication from the access network subsystem of the LTE wireless network during the one or more measurement gap time periods, the wireless communication device suspends communication on one or more carriers in the plurality of carriers to measure a set of signals from at least one additional network subsystem using at least a first receive signal chain in the wireless circuitry of the wireless communication device during at least a portion of the one or more measurement gap time periods, and receives at least a portion of a downlink communication from the network subsystem of the LTE wireless network using at least a second receive signal chain in the wireless circuitry of the wireless communication device during the at least a portion of the one or more measurement gap time periods. In another step, the wireless communication device provides one or more measurement reports to the access network subsystem of the LTE wireless network based at least in part on the set of signals received from the at least one additional network subsystem.

In another embodiment, a wireless communication device is described. The wireless communication device comprises one or more processors configured to control wireless circuitry of the wireless communication device connected to a access network subsystem of a wireless network and wireless circuitry configured to transmit signals to and receive signals from the access network subsystem of the wireless network according to a wireless communication protocol. The one or more processors of the wireless communication device are further configured to (1) establish a connection between the wireless communication device and the access network subsystem using a plurality of radio frequency carriers, each carrier centered at a different frequency; provide an indication to the access network subsystem of the wireless circuitry in the wireless communication device; (2) obtain a measurement gap configuration from the access network subsystem of the wireless network; (3) suspend communication to the access network subsystem on at least one radio frequency carrier in the plurality of radio frequency carriers during a measurement gap time period; (4) measure a set of signals received from a second access network subsystem using a first receive signal chain in the wireless circuitry during the measurement gap time period; and (5) provide a measurement report to the access network subsystem based at least in part on measurements of the set of signals.

In another embodiment, a computer program product encoded as computer program code in a non-transitory computer readable medium for configuring wireless circuitry in a wireless communication device connected to a wireless network is described. The computer program product includes the following computer program code. The computer program product includes (1) computer program code for establishing a connection to a access network subsystem of the wireless network; (2) computer program code for providing information about wireless circuitry included in the wireless communication device to the access network subsystem of the wireless network; (3) computer program code for obtaining a measurement gap configuration from the access network subsystem of the wireless network; (4) computer program code for configuring the wireless circuitry in the wireless communication device based at least in part on the measurement gap configuration during a measurement gap time period; and (5) computer program code for providing a measurement report to the access network subsystem based at least in part on signals measured during the measurement gap time period.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIGS. 6A to 6D illustrates several parallel carrier configurations for data reception and/or signal measurement by a wireless communication device in accordance with some embodiments.

DETAILED DESCRIPTION OF SELECTED EMBODIMENTS

Figure 1:
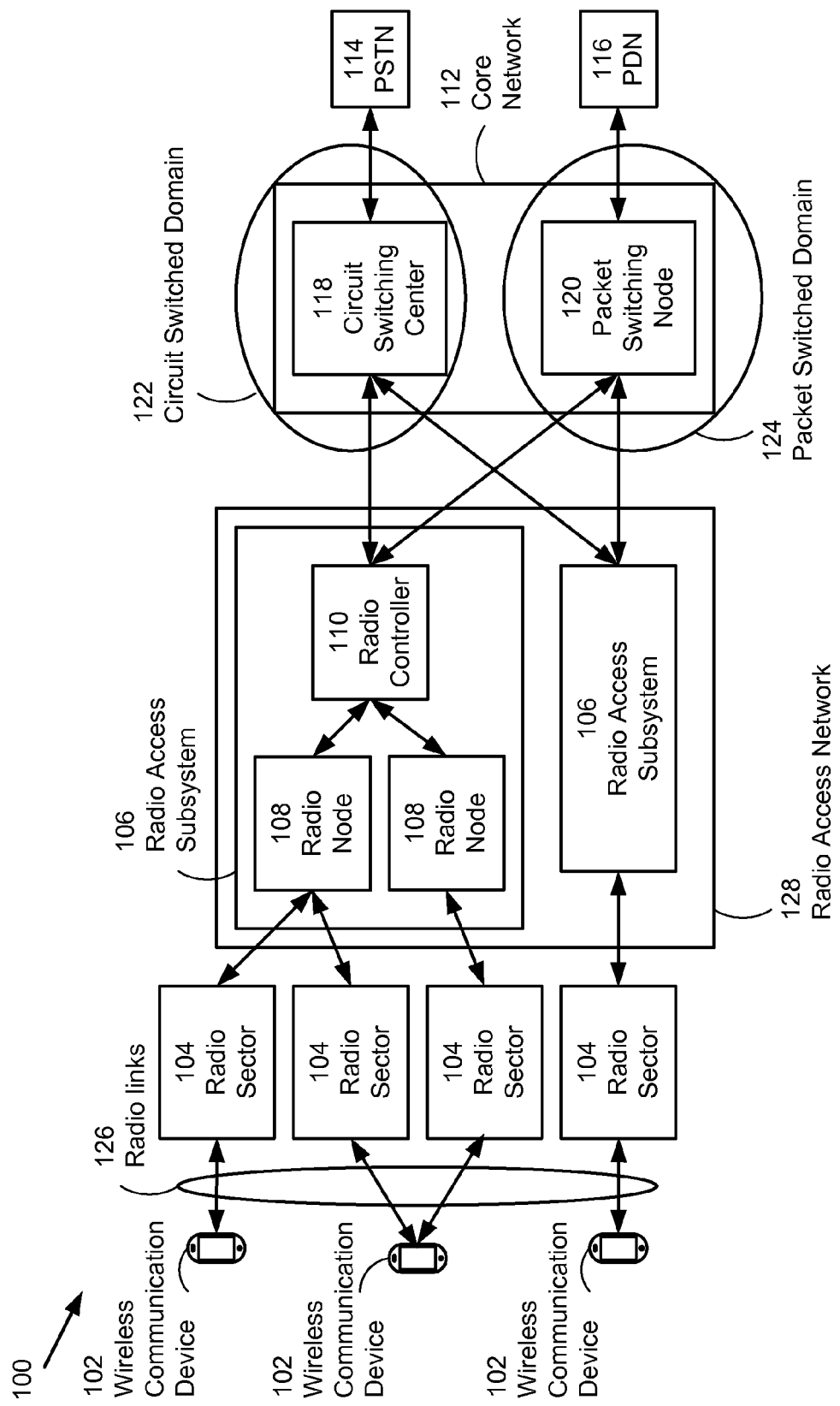
FIG. 1 illustrates components of a generic wireless communication network in accordance with some embodiments.

Wireless networks continue to evolve as network operators deploy equipment for new wireless communication technologies based on ongoing standardization efforts. Wireless communication devices can provide capabilities to communicate with wireless networks based on newer wireless network technologies that offer advanced capabilities, e.g., higher data rates and new services. High data rate transmission can be boosted by aggregating data transmission through multiple carriers simultaneously between the wireless communication device and an access network sub-system of a wireless network, e.g., using carrier aggregation across multiple cells of an eNodeB of an LTE/LTE-Advanced wireless network. Release 10 of the 3GPP LTE wireless communication protocol provides for simultaneous transmission on at least two independent carriers, a primary component carrier centered on a first frequency, and one or more secondary component carriers, each secondary component carrier centered on additional different frequencies. A wireless communication device supporting carrier aggregation can include wireless circuitry that includes at least two radio frequency receive signal chains that can each be tuned independently to receive signals from different carriers centered on different radio frequencies simultaneously. Each of the carriers can emanate from a different cell for a common eNodeB of the LTE/LTE-Advanced wireless network.

The eNodeB of the LTE/LTE-Advanced wireless network can configure the wireless communication device to measure signal quality and/or signal strength properties of additional cells during particular times and/or in response to particular events. For a wireless communication device with only one receive signal chain, the wireless communication device can suspend communication with a serving cell and re-tune the radio frequency of the receive signal chain to listen for signals from other cells using different frequencies (inter-freq measurements) and/or re-configure the receive signal chain to listen for signals from other cells using other radio access technologies (inter-RAT measurements). During the "measurement gap" time periods, the wireless communication device can be unable to receive downlink data from the serving cell, as the wireless communication includes only one wireless circuitry receive signal chain. For a wireless communication device with multiple wireless circuitry receive signal chains available for carrier aggregation, current versions of 3GPP LTE/LTE-Advanced wireless communication protocols continue to require suspending data transmission to the wireless communication device on all carriers used for carrier aggregation during measurement gap time periods. As described herein, a wireless communication device with multiple wireless circuitry receive signal chains can be configured to use the multiple receive signal chains to receive data from one or more serving cells and to measure signals from one or more additional cells during measurement gap time periods. The wireless communication device with multiple wireless circuitry receive signal chains can also be configured to suspend data from all serving cells and to measure signals from multiple additional cells simultaneously during measurement gap time periods. The wireless communication device can provide an indication of wireless circuitry capabilities to at least one of the serving cells, e.g., the primary cell, during and/or after establishing a connection with the eNodeB. The eNodeB can configure the wireless communication device to suspend communication on one or more serving cells during one or more measurement gap time periods.

In some embodiments, the eNodeB can configure the wireless communication device to suspend communication on all serving cells during one or more measurement gap time periods, and the wireless communication device can measure multiple additional inter-frequency and/or inter-RAT cells using multiple receive signal chains simultaneously, thereby shortening time and/or increasing accuracy of measurements from the additional cells. In some embodiments, the eNodeB can configure the wireless communication device to receive data from the primary serving cell and to suspend communication from one or more secondary serving cells during one or more measurement gap time periods. The wireless communication device can use one or more receive signal chains during the measurement gap time periods to measure signals from one or more additional cells, e.g., inter-frequency and/or inter-RAT cells, while simultaneously receiving data from the primary serving cell. In some embodiments, the eNodeB can configure the wireless communication device to receive data from a particular secondary serving cell and to suspend communication on the primary serving cell and one or more other secondary serving cells during one or more measurement gap time periods. The wireless communication device can use one or more receive signal chains during the measurement gap time periods to measure signals from one or more additional cells while simultaneously receiving data from the particular secondary serving cell. In some embodiments, the eNodeB can configure a first subset of serving cells to continue to be used for data communication during one or more measurement gap time periods and to suspend communication to the wireless communication device from a second subset of serving cells during the one or more measurement gap time periods. The wireless communication device can use one or more receive signal chains during the measurement gap time periods to measure signals from one or more additional cells while simultaneously receiving data from the first subset of serving cells. The eNodeB can select which serving cells to use for data and which serving cells to use for additional cell measurement, e.g., inter-frequency and/or inter-RAT cell measurements, based at least in part on intra-frequency cell measurement reports provided by the wireless communication device to the eNodeB. In some embodiments, the eNodeB can configure periodic measurement reports to use a first configuration during measurement gap time periods associated with the periodic measurement reports and can configure a-periodic event-based measurement reports to use a second configuration during measurement gap time periods associated with the a-periodic measurement reports. The first and second configurations can differ in the use of multiple receive signal chains of the wireless communication device, e.g., the first configuration can suspend communication to the wireless communication device on all serving cells and use all receive signal chains in parallel to receive from additional non-serving cells during periodic measurement gap time periods, while the second configuration can continue to use one of the receive signal chains to receive data from one of the serving cells (e.g., the primary serving cell) and use the remaining receive signal chains to measure signals from additional non-serving cells simultaneously during a-periodic measurement gap time periods. Other configurations of subsets of the receive signal chains in the wireless communication device during measurement gap time periods can also be used to provide for simultaneous reception of data communication from one or more serving cells and measurement of one or more additional non-serving cells during measurement gap time periods.

FIG. 1 illustrates a representative generic wireless network 100 that can include multiple wireless communication devices 102 connected by radio links 126 to radio sectors 104 provided by a radio access network 128. (Radio sectors 104 can also be referred to as cells, and wireless communication devices 102 can also be referred to as mobile devices, mobile terminals, user equipment, or other equivalent terms in some embodiments.) Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. Radio sectors 104 can overlap in geographic coverage, and the wireless communication device 102 can receive signals from multiple radio sectors 104. In some wireless networks 100, the wireless communication device 102 can be connected to more than one radio sector 104 simultaneously. The multiple radio sectors 104 to which the wireless communication device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128. In a connection between the wireless communication device 102 and the wireless network 100 using multiple, simultaneous radio links 126, each of the radio links 126 can be managed by the same radio controller 110 of a single radio access subsystem 106 in the radio access network 128. As illustrated in FIG. 1, the wireless communication device 102 can connect to a particular radio access subsystem 106 through two different radio sectors 104 (or in general multiple radio sectors 104) that emanate from two different radio nodes 108 connected to a common radio controller 110 of a common radio access subsystem 106 in the radio access network 128.

Radio resources that form the radio links 126 in the radio sectors 104 can be shared among multiple wireless communication devices 102 using a number of different multiplexing techniques, including time division, frequency division, code division, space division and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102. Suspension of allocation of radio resources to a wireless communication device 102 can occur without dis-establishing the RRC signaling connection to the wireless communication device 102. The radio controller 110 of the radio access subsystem 106 and configured the wireless communication device 102 to measure and report signal strength and/or signal quality information received by the wireless communication device 102. Measurement reporting performed by the wireless communication device 102 can be configured by the radio controller 110 using one or more RRC signaling messages, e.g., during RRC connection setup, RRC reconfiguration, and/or RRC re-establishment. The wireless communication device 102 can be configured for measuring radio frequency carriers of one or more serving cells (intra-frequency measurements), radio frequency carriers of one or more non-serving cells (inter-frequency measurements), and radio frequency carriers of one or more alternative radio access technology systems (inter-RAT measurements). The radio controller 110 can specify a set of cells to measure (e.g., a "white list") and/or a set of cells to exclude from measurement (e.g., a "black list"). Individual cells can be specifically identified, e.g., using physical layer cell identity information, e.g., physical layer cell identities (PCI) for LTE/LTE-Advanced cells, scrambling codes for UMTS cells, network color codes for GSM cells, and/or pseudo-noise (PN) offsets for CDMA 2000 cells.

The radio access network 128, which provides radio frequency air link connections to the wireless communication device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit-switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
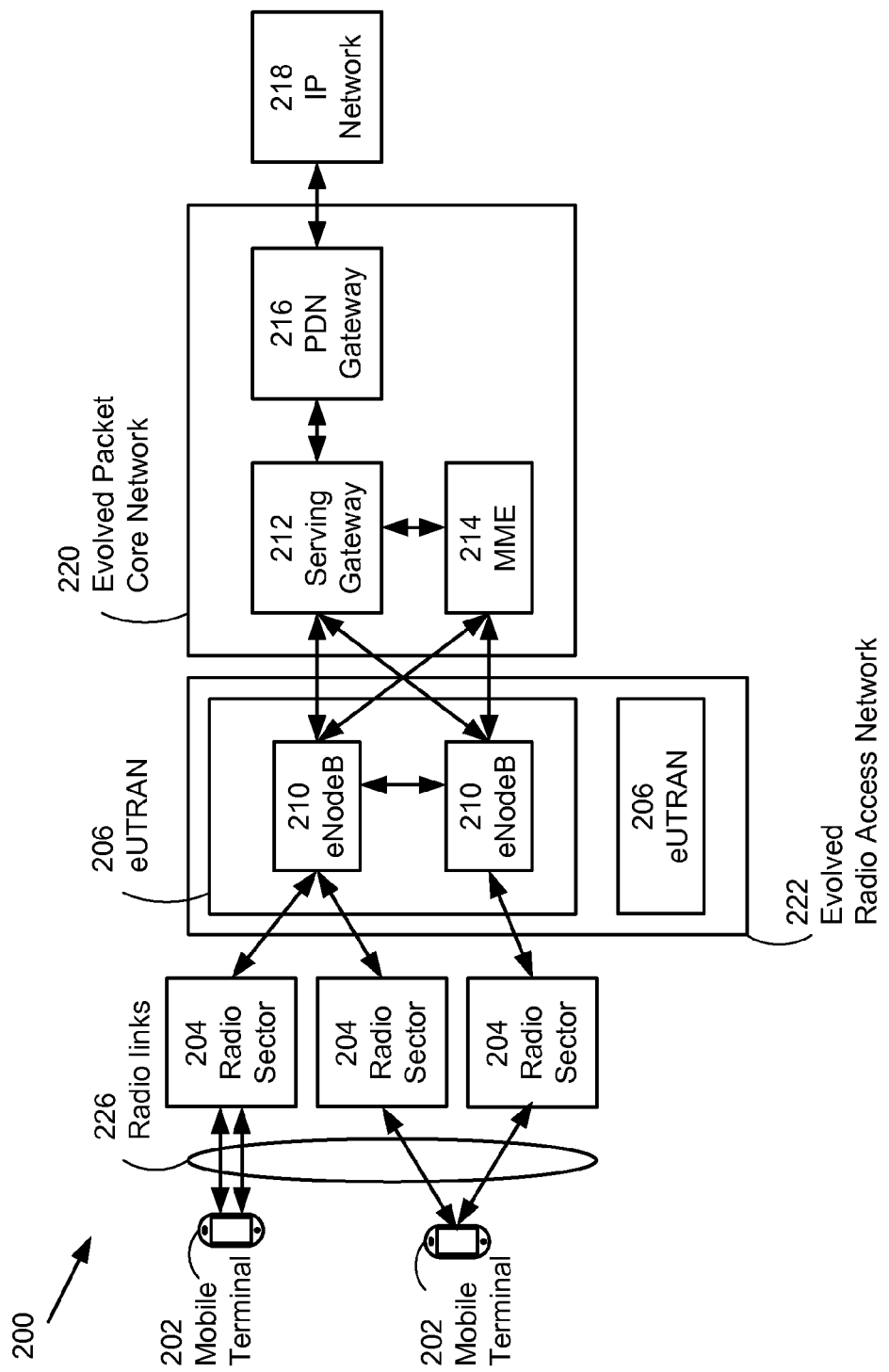
FIG. 2 illustrates components of an LTE (or LTE-Advanced) wireless communication network in accordance with some embodiments.

FIG. 2 illustrates a representative Long Term Evolution (LTE), or LTE-Advanced, wireless network 200 architecture designed as a packet switched network exclusively. A mobile terminal 202 can connect to an evolved radio access network 222 through radio links 226 associated with radio sectors 204 that emanate from evolved Node B's (eNodeB) 210. (In some embodiments, radio sectors 204 can also be referred to as cells and mobile terminals 202 can also be referred to as user equipment (UE) and/or as wireless communication devices 102.) The eNodeB 210 can include the functions of both transmitting and receiving base stations (such as radio nodes 108 in the generic wireless network 100) as well as base station radio controllers (such as the radio controller 110 in the generic wireless network 100). The equivalent core network of the LTE wireless network 200 is an evolved packet core network 220 including serving gateways 212 that interconnect the evolved radio access network 222 to public data network (PDN) gateways 216 that connect to external internet protocol (IP) networks 218. Multiple eNodeB 210 can be grouped together to form an eUTRAN 206. The eNodeB 210 can also be connected to a mobility management entity (MME) 214 that can provide control over connections for the mobile terminal 202.

The eNodeB 210 can control an allocation of radio resources for the radio links 226 to the mobile terminals 202. The eNodeB 210 can receive signaling messages from the mobile terminal 202 (or equivalently from the wireless communication device 102) that provides information by which the eNodeB 210 can schedule the availability of radio resources for the mobile terminal 202 (and for other mobile terminals 202 also communicating through one or more radio sectors 204). Information provided by the mobile terminals 202 to the eNodeB 210 can include an amount of data available for transmission (e.g., in buffer status reports), which can affect uplink radio resource allocations, as well as received signal conditions at the mobile terminal 202 (e.g., in measurement reports), which can affect downlink radio resource allocations. The eNodeB 210 can balance requirements for downlink and uplink transmission for multiple mobile terminals 202, allocating radio resources to one or more of the multiple mobile terminals 202 based on one or more scheduling criteria, e.g., measured and/or estimated channel conditions, measured and/or estimated signal-to-interference-plus-noise-ratio (SINR) levels, quantities of uplink data available for transport from the multiple mobile terminals 202, a past history of radio resource scheduling decisions for the multiple mobile terminals 202, and/or a past history of radio resource requests from the multiple mobile terminals 202.

The eNodeB 210 can configure multiple radio links 226 across multiple radio sectors 204 that emanate from the same eNodeB 210 to be used for carrier aggregation to a mobile terminal 202, in some embodiments. The eNodeB 210 can also configure measurement gap time periods (periodic and/or a-periodic event based measurements) during which time the mobile terminal 202 can suspend communication on at least one carrier with the eNodeB 210 in order to receive signals from other radio sectors 204 (equivalently cells) that use different radio frequencies and/or different radio access technologies. In some embodiments, the eNodeB 210 configures the mobile terminal 202 to suspend communication on all carriers through all radio sectors 204 associated with the mobile terminal 202 during the measurement gap time periods, e.g., stopping downlink and uplink data transmission during the measurement gap time periods. The mobile terminal 202 can use multiple, parallel radio frequency receive signal chains of wireless circuitry contained therein to receive and measure signals from multiple radio sectors 204 simultaneously. In some embodiments, the eNodeB 210 can configure the mobile terminal 202 to suspend communication on one or more of the carriers of particular radio sectors 204 associated with the mobile terminal 202, while maintaining downlink communication to the mobile terminal 202 over one or more other carriers of other particular radio sectors 204 associated with the mobile terminal. The mobile terminal 202 can use one or more radio frequency receive signal chains of wireless circuitry contained therein to receive downlink data from the eNodeB 210 (via one or more radio sectors 204) while simultaneously using one or more other radio frequency receive signal chains of the wireless circuitry contained therein to receive and measure radio frequency signals on other frequencies and/or using other radio access technologies to listen, measure, and provide signal strength and/ or signal quality information to the eNodeB 210 for signals received from other radio eNodeB 210, other eUTRAN 206, and/or other radio nodes 108 of other radio access networks 128.

Figure 3:
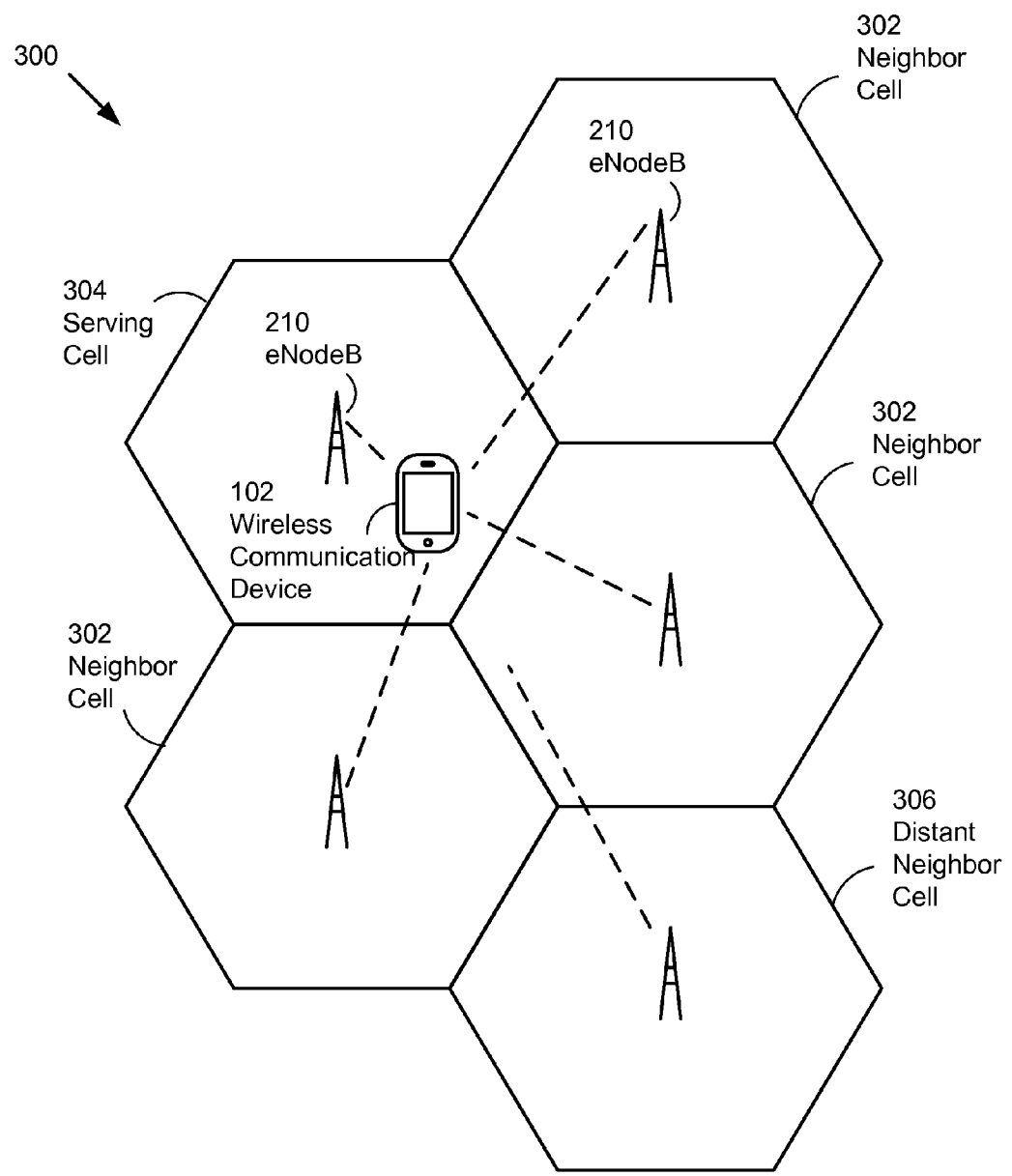
FIG. 3 illustrates signal reception by a wireless communication device from multiple cells of one or more wireless networks in accordance with some embodiments.

FIG. 3 illustrates a network 300 of adjoining cells including a serving cell 304 in which a wireless communication device 102 connects to an eNodeB 210. While not illustrated in FIG. 3, the network 300 can include overlapping cells of different sizes and geometries. As wireless communication devices 102 are generally mobile, signals received by the wireless communication device 102 can vary substantially as the wireless communication device 102 moves about the serving cell 304 and into neighbor cells 302. The wireless communication device 102 can measure signals received from one or more other neighbor cells 302 during one or more measurement gap time periods configured by the eNodeB 210 of the serving cell 304. Measurement reporting can be used as part of handover decision making by network elements of the wireless network 300 as the wireless communication device 102 traverses different cells 304/302 of the wireless network 300. Each of the neighbor cells 302 can use a different radio frequency carrier, and the wireless communication device 102 can tune one or more radio frequency receive signal chains of wireless circuitry contained in the wireless communication device 102 to listen for signals on different radio frequency carriers. As described herein, the wireless communication device 102 can suspend communication with the serving cell 304 to measure signals from neighbor cells 302. In some embodiments, the wireless communication device 102 can include multiple radio frequency receive signal chains in wireless circuitry contained therein and can therefore configure each of the multiple radio frequency receive signal chains to receive signals on different radio frequency carriers. In some embodiments, the wireless communication device 102 can configure a first radio frequency receive signal chain in wireless circuitry therein to receive downlink data from the eNodeB 210 via the serving cell 304, while simultaneously configuring a second radio frequency receive signal chain in the wireless circuitry therein to receive and measure signals from a neighbor cell 302, e.g., during a measurement gap time period. In some embodiments, the wireless communication device 102 can configure the second radio frequency receive signal chain in the wireless circuitry therein to receive data from the eNodeB 210 via the serving cell 304 during time periods other than measurement gap time periods, and can re-configure the second radio frequency receive signal chain to listen for signals on different radio frequencies, e.g., to measure signals received from each of several different neighbor cells 302. In some embodiments, the wireless communication device 102 includes multiple radio frequency signal chains that can receive and measure signals from multiple neighbor cells (and/or cells from networks that use other radio access technologies) at the same time. In some embodiments, the wireless communication device 102 configures only one radio frequency signal chain to receive and measure signals from multiple neighbor cells (and/or inter-RAT cells) sequentially. One or more distant neighbor cells 306 can be sufficiently distant (and/or signals can be blocked and/or signals can encounter destructive interference) such that the signals cannot be reliably received, decoded, and/or measured by the wireless communication device 102.

Figure 4:
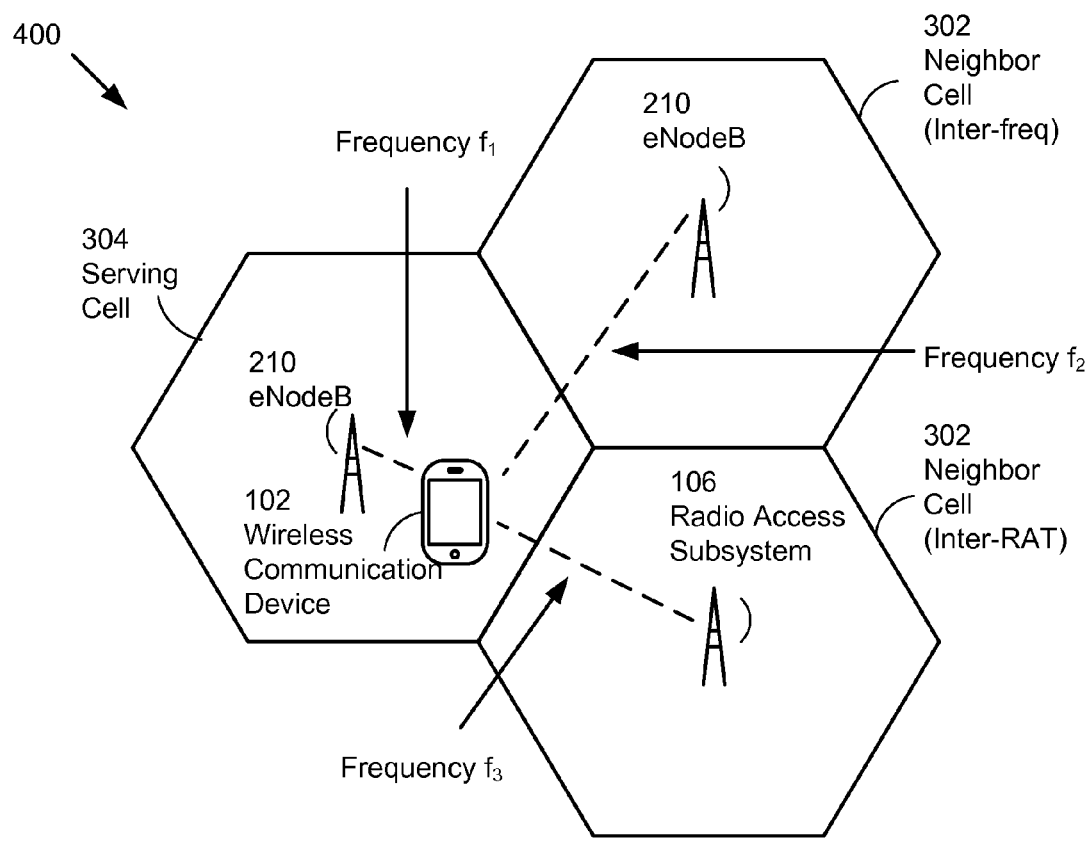
FIG. 4 illustrates signal measurement by a wireless communication device for multiple cells of one or more wireless networks in accordance with some embodiments.

FIG. 4 illustrates a network 400 in which a wireless communication device 102 can receive and measure signals from several different cells of different cell types. The wireless communication device 102 can be connected to an eNodeB 210 of the serving cell 304 using a first radio frequency $f_1$. The wireless communication device 102 can include wireless circuitry that includes one or more radio frequency receive signal chains that can be configured to receive radio frequency signals that use carriers centered on different radio frequencies. In some embodiments, the wireless communication device 102 includes multiple radio frequency receive signal chains that can be configured independently. The wireless communication device 102 can be configured by the eNodeB 210 of the serving cell 304 to listen for and measure signals from other cells during measurement gap time periods. The wireless communication device 102 can re-configure one or more of the radio frequency receive signal chains included in wireless circuitry therein to listen for and measure signals from additional non-serving cells, e.g., an "inter-frequency" neighbor cell 302 that transmits using a radio frequency $f_2$. When the eNodeB 210 of the serving cell 304 and the wireless communication device 102 supports carrier aggregation, at least two of the radio frequency receive signal chains included in the wireless circuitry of the wireless communication device 102 can be configured to receive downlink data from the eNodeB 210 of the serving cell 304 using at least two carriers on different radio frequencies simultaneously (not shown). In some embodiments, when the eNodeB 210 of the serving cell 304 and the wireless communication device 102 supports carrier aggregation, one of the radio frequency receive signal chains included in the wireless circuitry of the wireless communication device 102 can be configured to receive downlink data from the eNodeB 210 of the serving cell 304 using the radio frequency carrier at frequency $f_1$, and one of the radio frequency receive signal chains included in the wireless circuitry of the wireless communication device 102 can be configured to listen for and measure signals from cells that use other radio frequency carriers, e.g., from eNodeB 210 of the inter-frequency neighbor cell 302 on radio frequency carrier at frequency $f_2$ and/or from the radio access subsystem 106 of the inter-RAT neighbor cell 302 using a radio frequency carrier at frequency $f_3$. In some embodiments, the wireless communication device 102 can be configured to receive radio frequency signals from the inter-frequency neighbor cell 302 on the radio frequency carrier at frequency $f_2$ and from the inter-RAT neighbor cell 302 on the radio frequency carrier at frequency $f_3$ simultaneously (e.g., through two different parallel radio frequency receive signal chains included in wireless circuitry of the wireless communication device 102.) In some embodiments, when the eNodeB 210, serving cell(s) 304, and wireless communication device 102 support carrier aggregation (and therefore simultaneous reception on multiple carriers at different radio frequencies), the eNodeB 210 can configure the wireless communication device 102 to suspend communication on one or more carriers in order to listen and measure signals from other cells, e.g., on a particular carrier, on a primary carrier, on a secondary carrier, on a subset of carriers, or on all carriers. The wireless communication device 102 can use one or more receive signal chains, used for data reception outside of measurement gap time periods on the suspended carriers, to receive and measure signals from other cells simultaneously (and/or serially) during measurement gap time periods, e.g., as specified by the eNodeB 210 of the serving cell 304.

Figure 5:
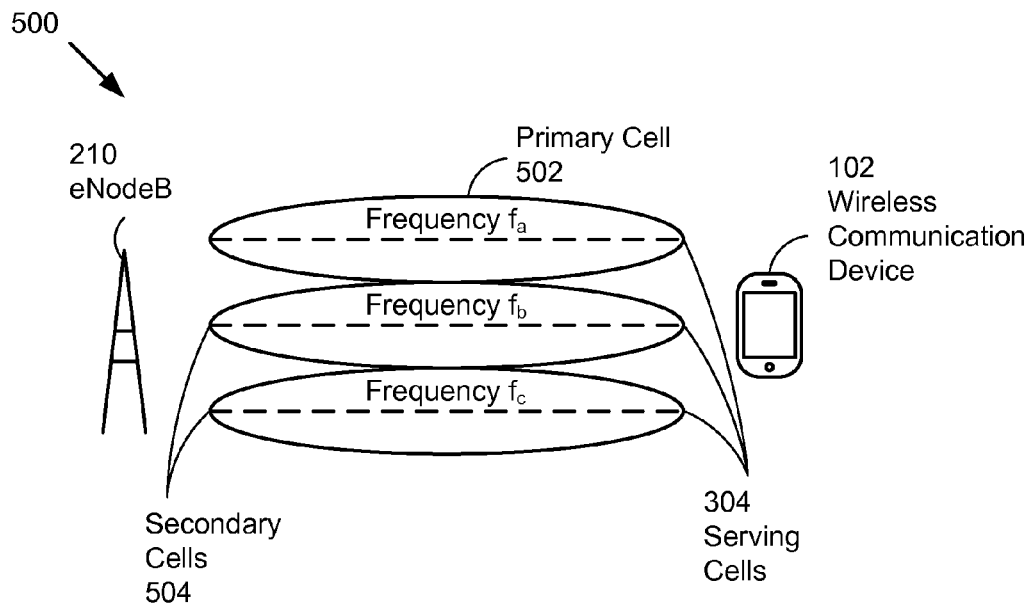
FIG. 5 illustrates carrier aggregation configurations for a wireless communication device in accordance with some embodiments.
Figure 5:
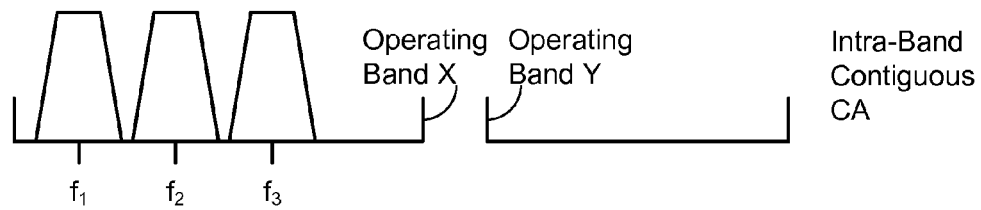
Figure 5:
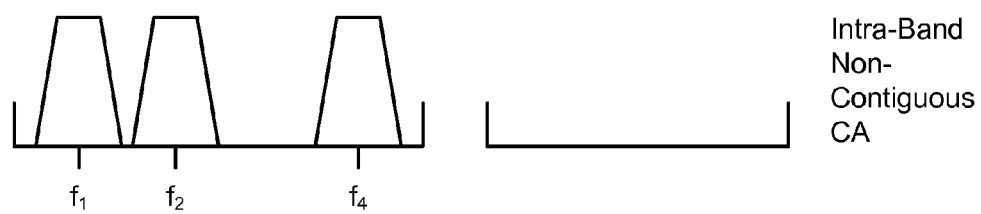
Figure 5:
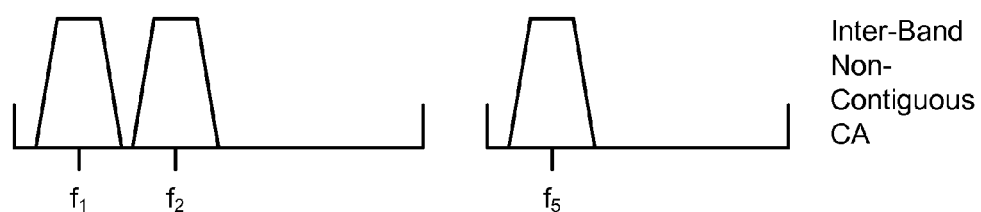

FIG. 5 illustrates a carrier aggregation transmission configuration 500 between the eNodeB 210 (of an LTE/LTE-Advanced wireless network) and the wireless communication device 102. The wireless communication device 102 can be connected simultaneously through multiple cells that use different radio frequency carriers to the eNodeB 210. Each of the cells used in the carrier aggregation transmission configuration 500 can be a serving cell 304, i.e., the wireless communication device 102 can be connected simultaneously to multiple serving cells 304 using carrier aggregation. Data transmission can be coordinated by the shared (common) eNodeB 210 from which all of the serving cells 304 emanate. The wireless communication device 102 can be connected to the eNodeB 210 through a single primary cell 502 and through one or more parallel secondary cells 504. The primary cell 502 and secondary cells 504 can use different carriers centered on different radio frequencies, e.g., primary cell 502 can use a carrier at frequency $f_a$, while secondary cells 504 can use carriers at frequencies $f_b$ and $f_c$. In some embodiments, there can be one primary cell 502 per connection between the eNodeB 210 and the wireless communication device 102. In some embodiments, there can be multiple secondary cells 504 per connection between the eNodeB 210 and the wireless communication device 102. Both the primary cell 502 and the secondary cells 504 can be categorized as serving cells 304. The carriers for each of the cells can be referred to as component carriers for a single connection between the eNodeB 210 and the wireless communication device 102. Carrier aggregation can be used in the downlink directly only, in some embodiments, and in both the downlink and uplink directions, in some embodiments. Carrier aggregation can provide for more bandwidth flexibility as illustrated in FIG. 5. The bandwidth provided for each component carrier can vary (not shown). A carrier aggregation transmission configuration can include "intra-band" contiguous carrier aggregation (CA) in which the transmission bandwidths for the primary cell 502 and the secondary cells 504 are contiguous in frequency, e.g., centered at multiple frequencies ($f_1$, $f_2$, $f_3$) within an operating band X as illustrated in FIG. 5. A carrier aggregation transmission configuration can alternatively include "intra-band" non-contiguous CA in which the transmission bandwidths for the primary cell 502 and the secondary cells are non-contiguous in frequency, at least in part, e.g., centered at multiple frequencies ($f_1$, $f_2$, $f_4$) within the operating band X as illustrated in FIG. 5. A carrier aggregation transmission configuration can further include "inter-band" non-contiguous CA in which the transmission bandwidths for the primary cell 502 and the secondary cells are non-contiguous in frequency across two different operating bands, e.g., centered at multiple frequencies ($f_1$, $f_2$) within the operating band X and also at one or more frequencies ($f_5$) within the operating band Y. In some embodiments, the wireless communication device 102 can include multiple radio frequency receive signal chains in wireless circuitry included therein, each receive signal chain tunable to different radio frequencies and/or different bands to allow for intra-band and/or inter-band CA. In some embodiments, component carriers can provide different geographic coverage areas (i.e., the primary and second cells can vary and/or overlap in geographic areas served.)

A radio resource control (RRC) layer can configure the component carriers of the primary cell 502 and the secondary cells 504 for CA use between the wireless communication device 102 and the eNodeB 210. A medium access control (MAC) layer can activate and deactivate component carriers for the primary cell 502 and the secondary cells 504. In some embodiments, the component carrier for the primary cell 502 always remains active during a connection between the eNodeB 210 and the wireless communication device 102. Measurement of signals received on any of the serving cells, i.e. the primary cell 502 and/or the secondary cells 504, can be referred to as "intra-frequency" measurements. Measurement of signals received on frequencies different from the frequencies used by the serving cells from cells that use the same radio access technology as the serving cells can be referred to as "inter-frequency" measurements. Measurement of signals received on frequencies different from the frequencies used by the serving cells 502/504, in particular, from cells that use a different radio access technology (RAT) than the serving cells 502/504, can be referred to as "inter-RAT" measurements.

A wireless communication device 102 that includes multiple radio frequency receive signal chains in wireless circuitry included therein can flexibly re-configure use of each of the receive signal chains when allowed by the eNodeB 210. In an embodiment, a basic configuration can permit use of multiple radio frequency receive signal chains to receive data on multiple carriers (carrier aggregation) from the eNodeB 210 and can suspend use of the multiple radio frequency receive signal chains during measurement gap time periods to receive and measure signals from other cells that use the same or a different radio access technology as the eNodeB 210. Measurement reporting by the wireless communication device 102 can be configured by the eNodeB 210. In some embodiments, measurement reporting can be configured for periodic reporting, e.g., based on expiration of a timer. In some embodiments, measurement reporting can be configured for a-periodic reporting, e.g., based on conditions for one or more events being satisfied. In some embodiments, a first set of events can trigger measurement reporting for cells that share the same radio access technology, e.g., for intra-frequency and/or inter-frequency LTE/LTE-Advanced cells, while a second set of events can trigger measurement reporting for cells that use a different radio access technology, e.g., for inter-RAT cells. The eNodeB 210 can define a measurement gap "pattern" and "offset" that can determine when the wireless communication device 102 can perform inter-frequency and/or inter-RAT measurements. During measurement gap time periods, the wireless communication device 102 can stop transmission and can receive signals through one or more parallel radio frequency receive signal chains configured for one or more different radio frequencies and/or radio access technologies. In some embodiments, the eNodeB 210 can provide a list of specific cells that the wireless communication device 102 can provide measurement information. In some embodiments, the wireless communication device 102 can also detect and measure signals from additional cells that are not specifically provided in a list from the eNodeB 210. Following one or more measurement gap time periods, the wireless communication device 102 can provide measurement information to the eNodeB 210, e.g., in one or more measurement reports. For inter-frequency measurement reports and/or inter-RAT measurement reports, the wireless communication device 102 can provide information on one or more sets of cells, including e.g., one or more serving cells, one or more "listed" cells indicated by the eNodeB 210 during configuration of the wireless communication device 102 for measurement reporting, and/or one or more "detected" cells observed by the wireless communication device 102 but not indicated by the eNodeB 210.

Event based measurement reporting can be configured by the eNodeB 210 based on one or conditions being satisfied. The conditions can include changes in signal strength and/or signal quality of one or more serving cells and/or one or more neighbor cells, e.g., compared against one or more thresholds and/or offsets. In some embodiments, signal strength and/or signal quality can be measured using a reference signal receive power (RSRP) and/or a reference signal receive quality (RSRQ). When measuring cells that use different radio access technologies, wireless communication protocols can specify which metrics to use for measuring the cells, e.g., a receive signal code power (RSCP) or a signal to noise plus interference ratio (e.g., Ec/Io) on a particular channel for a UMTS cell and/or a receive signal strength indication (RSSI) for a GSM cell and/or a pilot signal strength for a CDMA 2000 cell.

Figure 6A:
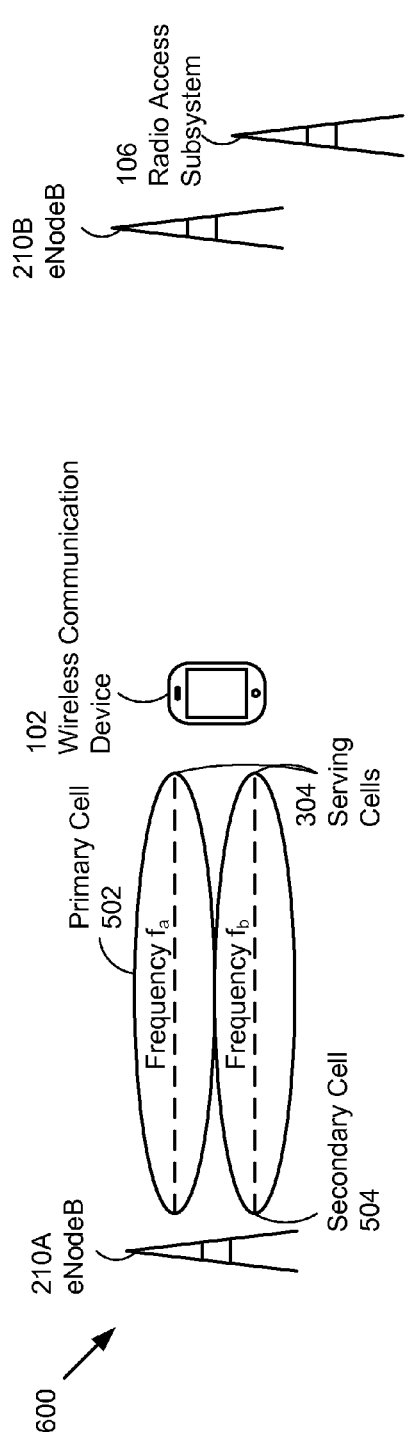
Figure 6B:
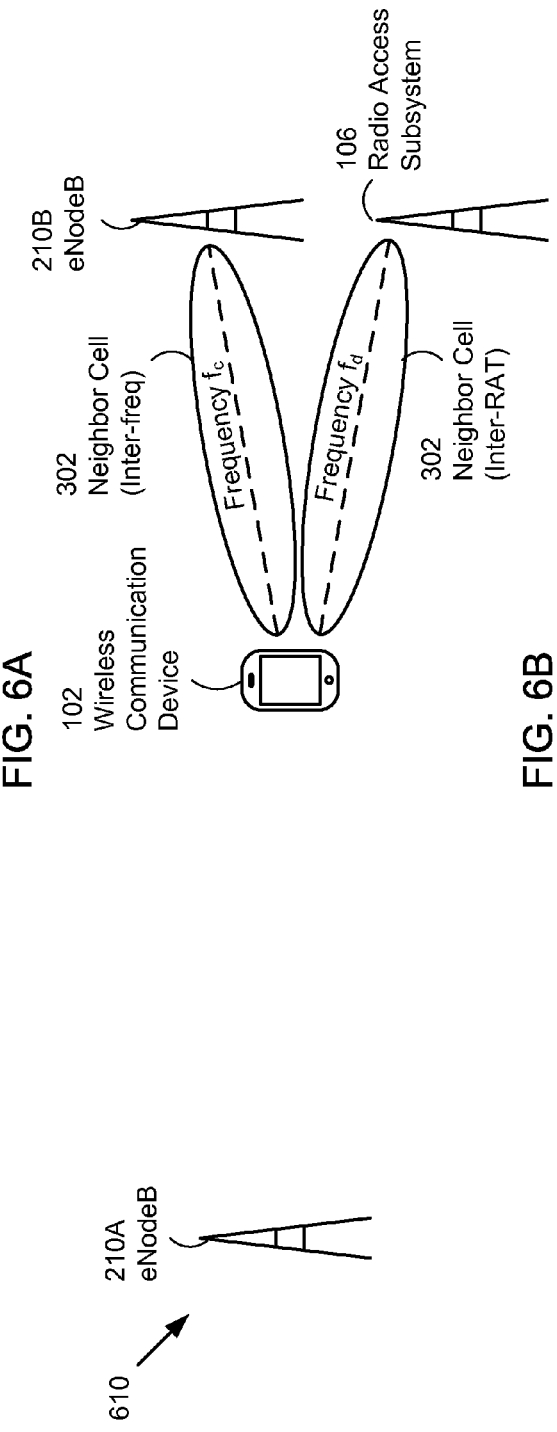

FIGS. 6A to 6D illustrate several different transmissions configurations for a mobile wireless communication device 102 to transmit/receive on multiple carriers through wireless circuitry that can include multiple radio frequency receive signal chains. As illustrated in FIG. 6A, a transmission configuration 600 of the wireless communication device 102 can support carrier aggregation for transmission and reception on multiple carriers of multiple serving cells 304, e.g., through a primary cell 502 using a carrier centered at frequency $f_a$ and through a secondary cell 504 using a carrier centered at frequency $f_b$. Using carrier aggregation, the wireless communication device 102 can receive downlink data transmissions from the eNodeB 210A via both the primary cell 502 and the secondary cell 504. As illustrated in FIG. 6B, during one or more measurement gap time periods, a transmission configuration 610 of the wireless communication device 102 can suspend communication with the eNodeB 210A and provide for reconfiguring one or more radio frequency receive signal chains of the wireless communication device 102 to listen for and receive signals from alternate cells, e.g., from the neighbor cell 302 emanating from eNodeB 210B on a different frequency $f_c$ and/or from the inter-RAT neighbor cell 302 from the radio access subsystem 106 using frequency $f_d$. In some embodiments, the wireless communication device 102 receives signals from eNodeB 210B and radio access subsystem 106 in parallel through two different radio frequency receive signal chains included in wireless circuitry of the wireless communication device 102. As illustrated in FIG. 6C, during one or more measurement gap time periods, a transmission configuration 620 of the wireless communication device 102 can suspend communication with the eNodeB 210A on at least one of the serving cells, e.g., on the secondary cell 504, and can provide for continued communication (at least in the downlink direction) with the eNodeB 210A on at least one of the serving cells, e.g., on the primary cell 502. At the same time, during the one or more measurement gap time periods, the transmission configuration 620 provides for reception of signals from additional cells by the wireless communication device 102 in parallel to reception over the primary cell 502. In some embodiments, one or more radio frequency receive signal chains of wireless circuitry included in the wireless communication device 102 can be configured to receive signals from an inter-frequency neighbor cell 302 on a radio frequency $f_c$ from eNodeB 210B and/or from an inter-RAT neighbor cell 302 on a radio frequency $f_d$ from the radio access subsystem 106. In some embodiments, e.g., where the wireless communication device 102 includes only two radio frequency receive signal chains in the wireless circuitry, the wireless communication device 102 can configure a first radio frequency receive signal chain to receive signals via the primary cell 502 on frequency $f_a$ from eNodeB 210A and a second radio frequency receive signal chain to receive signals either via the inter-frequency neighbor cell 302 on frequency $f_c$ from eNodeB 210B or via the inter-RAT neighbor cell 302 on frequency $f_d$ from the radio access subsystem 106. In some embodiments, the wireless communication device 102 can configure the second radio frequency receive signal chain to listen to the inter-frequency neighbor cell 302 followed by the inter-RAT neighbor cell 302. In a wireless communication device 102 that includes three or more radio frequency receive signal chains, the wireless communication device 102 can configure a first radio frequency receive signal chain to remain on frequency $f_a$ for reception of communication from eNodeB 210A via the primary cell 502, and configure a second radio frequency receive signal chain to frequency $f_c$ for reception of signals from eNodeB 210B via the inter-frequency neighbor cell 302 at the same time, and further configure a third radio frequency receive signal chain to frequency $f_d$ for reception of signals from the radio access subsystem 106 via the inter-RAT neighbor cell 302 as well. As may be understood by a person of ordinary skill, the wireless communication device 102 can include a plurality of radio frequency receive signal chains in the wireless circuitry that can be configured for simultaneous reception from a single eNodeB 210A for carrier aggregation and re-configured for simultaneous reception from the eNodeB 210A (e.g., to continue downlink data transmission) and for listing and measuring signals received from one or more other access network subsystems, e.g., from eNodeB 210B and/or radio access subsystem 106 during one or more measurement gap time periods. FIG. 6D illustrates another transmission configuration 630 in which one or more radio frequency receive signal chains of wireless circuitry of the wireless communication device 102 are configured to receive transmissions from a serving cell 304, e.g., using the secondary cell 504 at frequency $f_b$, while also listening, receiving and measuring signals from one or more other cells, e.g., from eNodeB 210B via the inter-frequency neighbor cell 302 at frequency $f_c$ and/or from radio access subsystem 106 via the inter-RAT neighbor cell 302 at frequency $f_d$ during one or more measurement gap time periods. In some embodiments, the eNodeB 210A can require the primary cell 502 to be always active when the wireless communication device 102 is connected to eNodeB 210A and thus can indicate reconfiguration of only the radio frequency receive signal chains used for the one or more secondary cells 504 during one or more measurement gap time periods. In some embodiments, the eNodeB 210A can select which of the primary cell 502 and/or secondary cells 504 to allow reconfiguration during measurement gap time periods, e.g., based on intra-frequency measurement reporting provided by the wireless communication device 102, which can provide an indication of signal strength and or signal quality at the wireless communication device 102 for each of the primary cell 502 and the secondary cells 504 to the eNodeB 210A to assist with selection of cells to use for data and other cells to use for measurement reporting during one or more measurement gap time periods.

Figure 7:
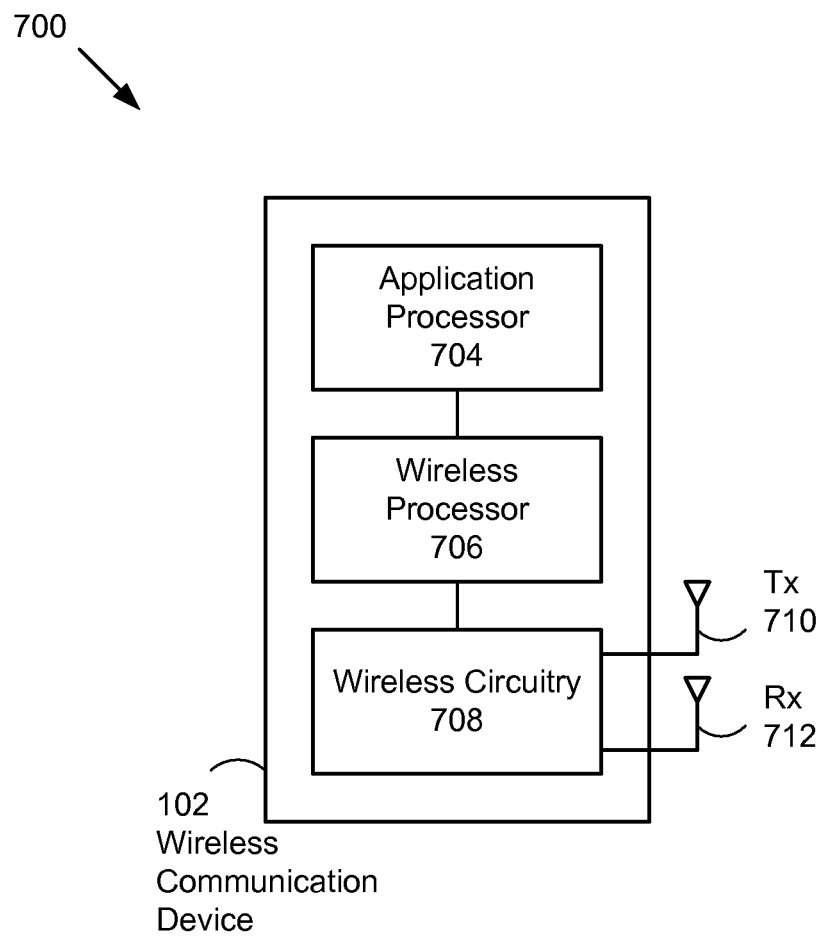
FIG. 7 illustrates select components of a wireless communication device in accordance with some embodiments.

FIG. 7 illustrates select components 700 of the wireless communication device 102 that can be used for processing radio frequency signals for transmission and reception by the wireless communication device 102. The wireless communication device 102 can include one or more processors and wireless circuitry that can cooperate together in establishing connections, interacting with application programs, formatting data in accordance with one or more wireless communication protocols, translating digital data into radio frequency signals suitable for transmission, and similarly converting received radio frequency signals into digital data. The wireless communication device 102 can include an application processor 704 that can request establishment of wireless connections to support communication for various applications running thereon. The wireless communication device 102 can also include a wireless processor 706 that can control the establishment and release of wireless connections to provide connectivity and communication for the wireless communication device 102 at least in part in response to request from the application processor 704. The wireless processor 706 can also provide for suitable formatting and in some embodiments modulation of data for transmission and demodulation of data for reception of radio frequency signals through wireless circuitry 708 included in the wireless communication device 102. The wireless circuitry 708 can be connected to one or more radio frequency transmit signal chains (including internal and/or external circuitry, e.g., antennas) 710 and one or more radio frequency receive signal chains (including internal and/or external circuitry, e.g., antennas) 712. In some embodiments, the wireless circuitry 708 includes multiple radio frequency receive signal chains that can provide for carrier aggregation of radio frequency signals using multiple carriers simultaneously for communication between the wireless communication device 102 and multiple cells (radio sectors 204) connected to a common eNodeB 210. The wireless communication device 102 can configure the wireless processor 706 and wireless circuitry 708/710/712 to receive radio frequency signals from one or more radio sectors 204 (cells) individually in series and/or collectively in parallel. In some embodiments, the wireless processor 706 can configure wireless circuitry 708/710/712 to receive radio frequency signals on a first set of frequencies from a set of serving cells 304 and can re-configure the wireless circuitry 708/710/712 to receive radio frequency signals on a second set of frequencies from a set of inter-frequency neighbor cells 302 and/or inter-RAT neighbor cells 302, e.g., during measurement gap time periods specified by the eNodeB 210A to which the wireless communication device 102 can be connected through the serving cells 304 during normal communication.

The wireless communication device 102 can include wireless circuitry that supports different wireless communication protocols and/or radio access technologies. In some embodiments, the wireless communication device 102 can include separate wireless circuitry for different wireless communication protocols and/or radio access technologies. In some embodiments, the wireless communication device 102 can include a combined, integrated block of wireless circuitry that can support a combination of different wireless communication protocols and/or different radio access technologies. The wireless circuitry 708 can include transmitters and receivers to provide signal processing of radio frequency wireless signals formatted according to one or more wireless communication protocols, e.g., GSM, UMTS, CDMA 2000, LTE, and/or LTE-Advanced wireless communication protocols. In some embodiments, the wireless circuitry 708 can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

Figure 8:
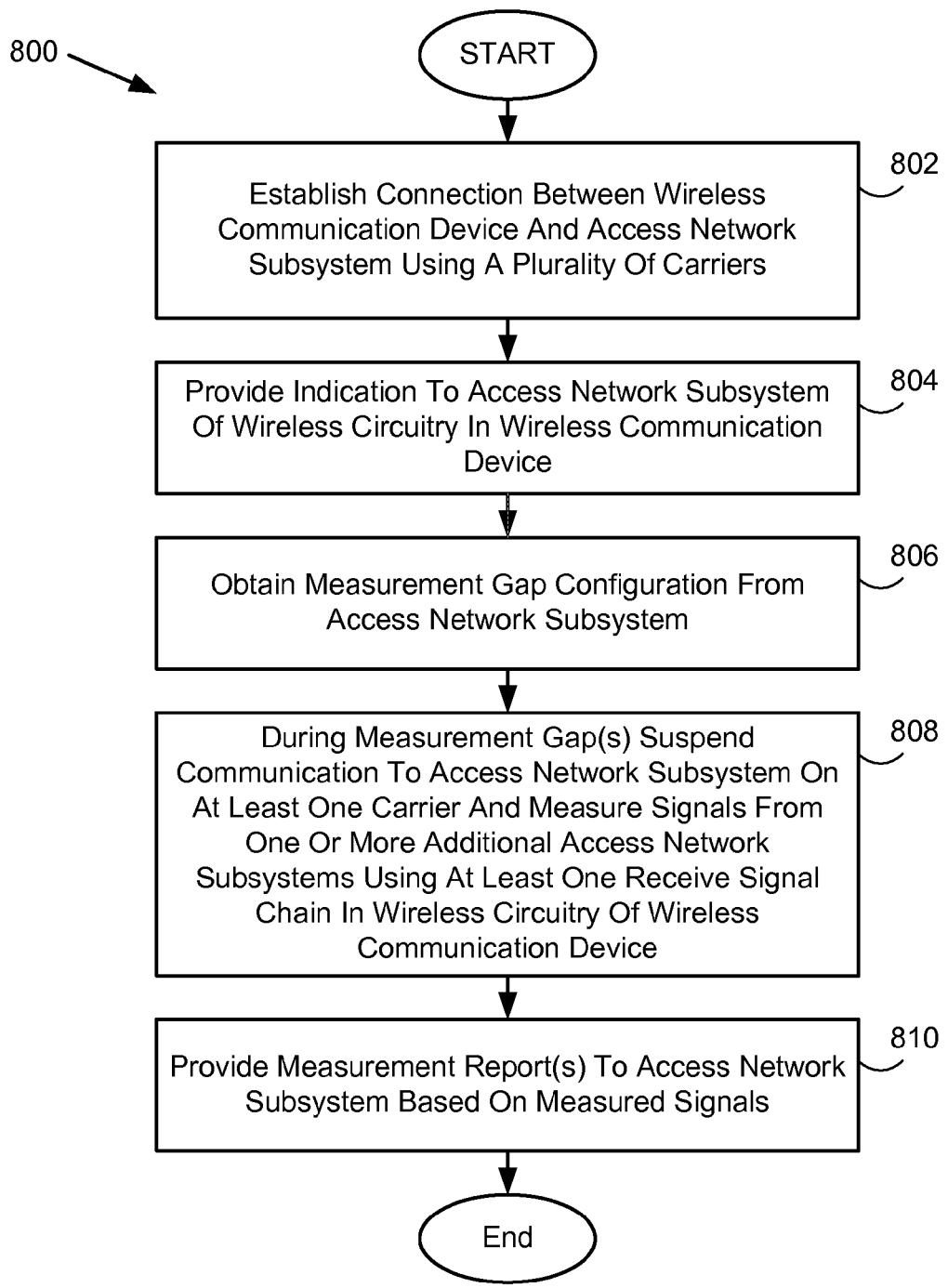
FIG. 8 illustrates a representative method for simultaneous data reception and signal measurements in a wireless communication device in accordance with some embodiments.

FIG. 8 illustrates a representative method 800 for simultaneous data reception and signal measurements in a wireless communication device 102 in accordance with some embodiments. In a first step 802, a wireless connection can be established between the wireless communication device 102 and a access network subsystem of a wireless network, e.g., an eUTRAN 206 or an eNodeB 210 contained therein in an LTE/LTE-Advanced wireless network 200, using a plurality of radio frequency carriers, e.g., using a carrier aggregation communication as provided for in an LTE-Advanced wireless communication protocol. In some embodiments each radio frequency carrier is centered at a different frequency for a different serving cell providing the wireless connection to the wireless communication device 102. In some embodiments, the serving cells include a primary serving cell using a first radio frequency carrier and one or secondary serving cells using additional radio frequency carriers. In step 804, the wireless communication device 102 provides an indication of wireless circuitry included therein, e.g., wireless circuitry 708/710/712, to the access network subsystem of the wireless network. In some embodiments, the indication of wireless circuitry provides information to assist the access network subsystem in configuring the wireless circuitry of the wireless communication device 102 during measurement gap time periods. In some embodiments, the indication of wireless circuitry includes an indication of a plurality of receive signal chains that can be configured to receive radio frequency signals using different radio frequency carriers independently. In step 806, the wireless communication device 102 can obtain a measurement gap configuration from the access network subsystem of the wireless network. The measurement gap configuration can provide information about which carriers on which to suspend communication with the access network subsystem during one or more measurement gap time periods in order to measure radio frequency signals from additional cells on different frequencies and/or using different radio access technologies than used by the access network subsystem. In some embodiments, the measurement gap configuration applies to periodic measurement reporting and/or to a-periodic measurement reporting. In some embodiments, the measurement gap configuration applies for a particular period of time and/or a particular duration of time. In some embodiments, the measurement gap configuration includes a list of identifiers for cells that the wireless communication device 102 can listen and measure signals from. In some embodiments, the list of identifiers for cells includes one or more of: a first set of intra-frequency cells, a second set of inter-frequency cells, and a third set of inter-RAT cells. In step 808, the wireless communication device 102 suspend communication to the access network subsystem of the wireless network on at least one carrier and measure signals from one or more additional access network subsystems using at least one receive signal chain in the wireless circuitry of the wireless communication device 102. In some embodiments, the wireless communication device 102 reconfigures one or more receive signal chains in the wireless circuitry of the wireless communication device 102 based at least in part on the measurement gap configuration provided by the access network subsystem of the wireless network. In some embodiments, the measurement gap configuration indicates suspension of communication between the wireless communication device 102 and the access network subsystem of the wireless network on all carriers, and the wireless communication device 102 reconfigures two or more receive signal chains to listen for and measure signals from two or more additional access network subsystems in parallel during one or more measurement gap time periods. In some embodiments, the measurement gap configuration indicates suspension of communication between the wireless communication device 102 and the access network subsystem of the wireless network on one, a plurality, or all carriers used by secondary cells in the connection between the wireless communication device 102 and the access network subsystem of the wireless network. In some embodiments, the measurement gap configuration indicates continuation of downlink communication on a carrier used by a primary cell in the connection between the wireless communication device 102 and the access network subsystem of the wireless network. The wireless communication device 102 can continue to receive downlink data from the access network subsystem of the wireless network using a first receive signal chain of the wireless circuitry while listening for and measuring signals from another access network subsystem using a second receive signal chain of the wireless circuitry during one or more measurement gap time periods. In some embodiments, the wireless communication device 102 includes a plurality of receive signal chains providing for reception of data communication from the access network subsystem of a serving cell, e.g., on a primary cell's carrier or on a secondary cell's carrier, while also listening for, receiving, and measuring signals from one or more access network subsystems of neighbor cells, e.g., inter-frequency and/or inter-RAT neighbor cells. In step 810, the wireless communication device 102 provides one or more measurement reports to the access network subsystem of the wireless network based on signals received from additional access network subsystems during one or more measurement gap time periods.

Figure 9:
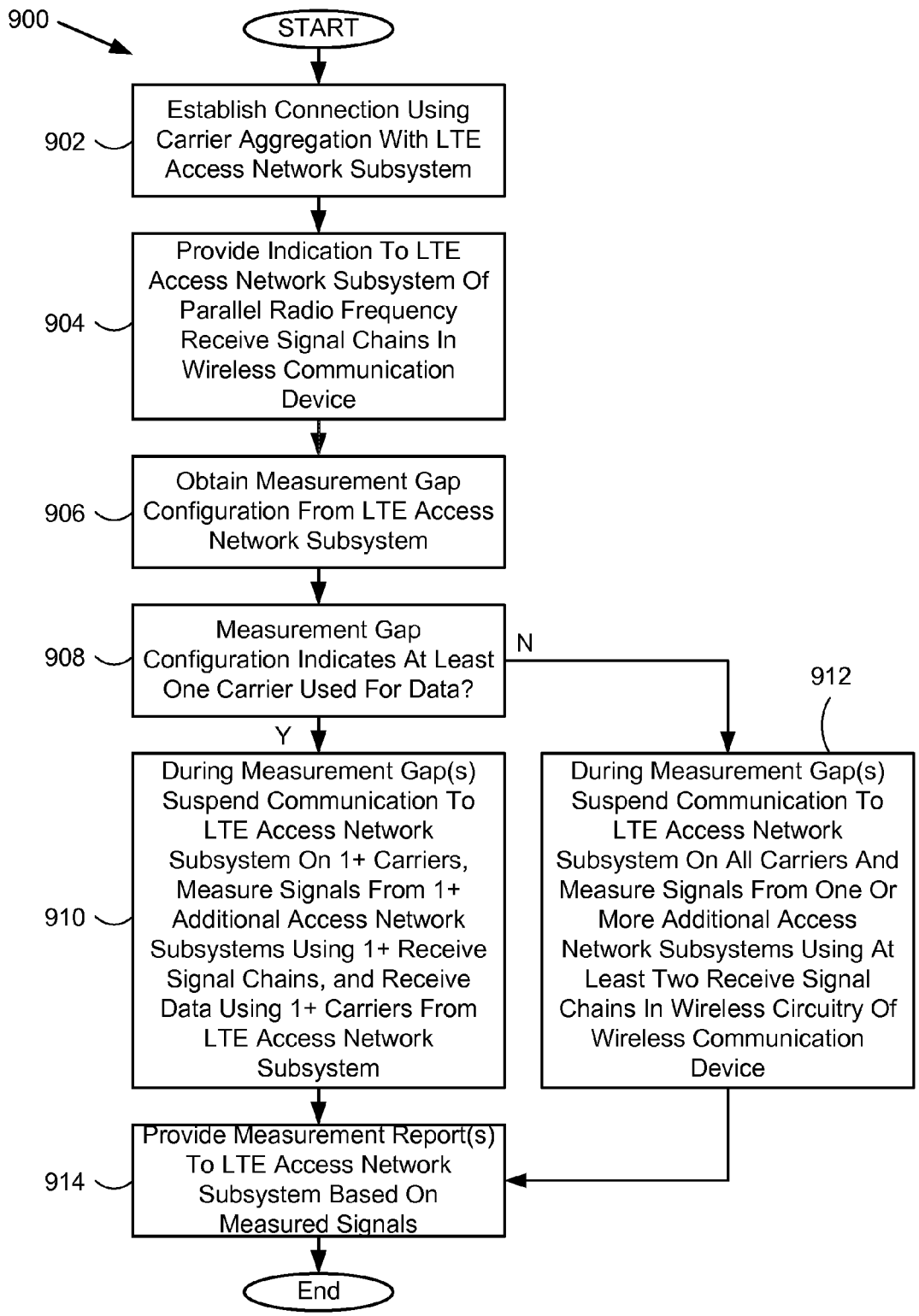
FIG. 9 illustrates another representative method for use of wireless circuitry in a wireless communication device during measurement gaps in accordance with some embodiments.

FIG. 9 illustrates another representative method 900 for use of wireless circuitry in a wireless communication device 102 during measurement gap time periods in accordance with some embodiments. In step 902, the wireless communication device 102 can establish a connection using carrier aggregation with an access network subsystem, e.g., an eNodeB 210, of an LTE/LTE-Advanced wireless network 200. In step 904, the wireless communication device 102 provides an indication to the access network subsystem of the LTE/LTE-Advanced wireless network 200 of a number of parallel radio frequency receive signal chains included in wireless circuitry of the wireless communication device 102. In some embodiments, the wireless communication device 102 indicates the number of receive signal chains that can be reconfigured during one or more measurement gap time periods to listen for, receive, and measure signals from one or more additional access network subsystems. In step 906, the wireless communication device 102 obtains a measurement gap configuration from the access network subsystem of the LTE/LTE-Advanced wireless network 200. In some embodiments, the measurement gap configuration provides information about which carriers used for carrier aggregation data communication to suspend and to reconfigure associated radio frequency receive signal chains during one or more measurement gap time periods to listen for, receive, and measure signals from the additional access network subsystems that use different radio frequencies and/or different radio access technologies from the access network subsystem of the LTE/LTE-Advanced wireless network 200. In step 908, the wireless communication device 102 determines whether the measurement gap configuration obtained from the access network subsystem of the LTE/LTE-Advanced wireless network 200 indicates that at least one carrier can continue to be used for data communication during one or more measurement gap time periods. When the measurement gap configuration obtained from the access network subsystem of the LTE/LTE-Advanced wireless network 200 indicates that at least one carrier used for carrier aggregation communication between the wireless communication device 102 and the access network subsystem can continue to be used for data communication during one or more measurement gap time periods, the wireless communication device 102, in step 910, suspends communication on at least one carrier to reconfigure at least one associated radio frequency receive signal chain to measure signals from one or more additional access network subsystems during one or more measurement gap time periods. In some embodiments, the wireless communication device 102 continues to receive data communication from the access network subsystem of the LTE/LTE-Advanced wireless network 200 during at least a portion of the one or more measurement gap time periods. In some embodiments, the wireless communication device 102 maintains communication using a carrier associated with a primary cell on the connection to the access network subsystem of the LTE/LTE-Advanced wireless network 200. In some embodiments, the wireless communication device maintains communication using a carrier associated with a secondary cell on the connection to the access network subsystem of the LTE/LTE-Advanced wireless network 200. In some embodiments, the access network subsystem specifies the particular carrier/cell(s) on which to maintain communication during the one or more measurement gap time periods, e.g., in the measurement gap configuration. In some embodiments, the access network subsystem specifies the particular carrier/cell(s) on which to suspend communication during the one or more measurement gap time periods, e.g., in the measurement gap configuration. When the measurement gap configuration obtained from the access network subsystem of the LTE/LTE-Advanced wireless network 200 indicates that no carriers used for carrier aggregation communication between the wireless communication device 102 and the access network subsystem can be used for data communication during one or more measurement gap time periods, the wireless communication device 102, in step 912, suspends communication on all carriers to reconfigure at least one associated radio frequency receive signal chain to measure signals from one or more additional access network subsystems during one or more measurement gap time periods. In some embodiments, the wireless communication device 102 reconfigures a plurality of radio frequency receive signal chains to measure signals from a plurality of additional access network subsystems simultaneously during at least a portion of the one or more measure gap time periods. In step 914, the wireless communication device 102 provides one or more measurement reports based at least in part on measurements of signals received during at least a portion of the one or more measurement gap time periods to the access network subsystem of the LTE/LTE-Advanced wireless network 200.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to configure wireless circuitry, during one or more measurement gap time periods, in a wireless communication device connected to a long term evolution (LTE) wireless network, the method comprising:
 establishing a connection that uses a plurality of downlink carriers simultaneously for carrier aggregation between the wireless communication device and an access network subsystem of the LTE wireless network;
 providing an indication of a number of parallel radio frequency receive signal chains included in wireless circuitry of the wireless communication device to the access network subsystem of the LTE wireless network;
 obtaining a measurement gap configuration from the access network subsystem of the LTE wireless network;
 determining whether the measurement gap configuration indicates the wireless communication device is to suspend data communication on all carriers;
 when the measurement gap configuration indicates at least one carrier in the plurality of downlink carriers is usable for downlink communication from the access network subsystem of the LTE wireless network during the one or more measurement gap time periods:
  suspending communication on one or more carriers in the plurality of downlink carriers to measure a first set of signals from at least one additional access network subsystem using at least a first receive signal chain in the wireless circuitry of the wireless communication device during at least a portion of the one or more measurement gap time periods; and
  receiving at least a portion of a downlink communication from the access network subsystem of the LTE wireless network using at least a second receive signal chain in the wireless circuitry of the wireless communication device during the at least a portion of the one or more measurement gap time periods; and
 providing one or more measurement reports to the access network subsystem of the LTE wireless network based at least in part on the first set of signals received from the at least one additional access network subsystem;
 when the measurement gap configuration indicates the wireless communication device is to suspend data communication on all carriers thereby stopping downlink and uplink data communication during the at least a portion of the one or more measurement gap time periods:
  receiving a second set of signals from the plurality of downlink carriers, and
  providing a second measurement report to the access network subsystem of the LTE wireless network based on the second set of signals.

2. The method recited in claim 1, wherein the at least one carrier in the plurality of downlink carriers comprises a carrier associated with a primary cell used for the carrier aggregation between the wireless communication device and the access network subsystem of the LTE wireless network.

3. The method recited in claim 1, wherein the one or more carriers in the plurality of downlink carriers on which to suspend communication are associated with one or more secondary cells used for the carrier aggregation between the wireless communication device and the access network subsystem of the LTE wireless network.

4. The method recited in claim 1, wherein the wireless communication device simultaneously receives the at least a portion of the downlink communication from the access network subsystem of the LTE wireless network using the second receive signal chain and receives signals from an additional network subsystem using the first receive signal chain.

5. The method recited in claim 1, wherein a wireless processor in the wireless communication device reconfigures the first receive signal chain to listen for the first set of signals from the at least one additional access network subsystem, and the at least one additional network subsystem transmits using frequencies different from a set of frequencies used for the plurality of downlink carriers for carrier aggregation between the wireless communication device and the access network subsystem of the LTE wireless network.

6. The method recited in claim 1, wherein the at least one additional network subsystem includes a second access network subsystem that transmits using a radio access technology different from the access network subsystem of the LTE wireless network.

7. The method recited in claim 1, wherein the measurement gap configuration includes a third set of carriers in the plurality of downlink carriers on which to receive downlink communication from the access network subsystem of the LTE wireless network during the one or more measurement gap time periods and a fourth set of carriers in the plurality of downlink carriers on which to suspend downlink communication from the access network subsystem of the LTE wireless network during the one or more measurement gap time periods.

8. The method recited in claim 7, wherein the measurement gap configuration further includes a list of identifiers for at least a portion of the at least one additional network subsystem from which to measure signals.

9. A wireless communication device comprising:
 one or more processors configured to control wireless circuitry of the wireless communication device connected to a access network subsystem of a wireless network; and
 the wireless circuitry configured to transmit signals to and receive signals from the access network subsystem of the wireless network according to a wireless communication protocol;
 wherein the one or more processors are further configured to:
  establish a connection between the wireless communication device and the access network subsystem using a plurality of radio frequency carriers, each carrier centered at a different frequency;
  provide an indication to the access network subsystem of the wireless circuitry in the wireless communication device;
  obtain a measurement gap configuration, from the access network subsystem of the wireless network, wherein the measurement gap configuration indicates the wireless communication device is to suspend data communication on all carriers through all radio sectors associated with the wireless communication device during a measurement gap time period;
  suspend communication to the access network subsystem on the plurality of radio frequency carriers during the measurement gap time period, thereby stopping downlink and uplink data communication during the measurement gap time period;

measure a first set of signals received from a second access network subsystem using a first receive signal chain in the wireless circuitry during the measurement gap time period; and provide a measurement report to the access network subsystem based at least in part on measurements of the first set of signals.

10. The wireless communication device recited in claim 9, wherein the wireless communication protocol is a third generation partnership project (3GPP) long term evolution (LTE) wireless communication protocol, and the connection supports carrier aggregation using the plurality of radio frequency carriers for communication between the access network subsystem of the wireless network and the wireless communication device.

11. The wireless communication device recited in claim 10, wherein measure the first set of signals received from the second access network subsystem using the first receive signal chain comprises:

configure the first receive signal chain from a first frequency used by a first carrier in the plurality of radio frequency carriers to a second frequency used by a second carrier used by the second access network subsystem;

receive at least a portion of the first set of signals through the first receive signal chain; and measure a signal strength or a signal quality of the at least a portion of the first set of signals received through the first receive signal chain.

12. The wireless communication device recited in claim 10, wherein the one or more processors are further configured to:

measure a second set of signals received from a third access network subsystem using a second receive signal chain in the wireless circuitry during the measurement gap time period; wherein at least a portion of the first set of signals received from the second access network subsystem and the second set of signals received from the third access network subsystem are received simultaneously by the wireless circuitry of the wireless communication device.

13. The wireless communication device recited in claim 12, wherein the measurement gap configuration obtained from the access network subsystem of the wireless network comprises an indication to suspend communication on a third set of carriers in the plurality of radio frequency carriers and to maintain communication on a fourth set of carriers in the plurality of radio frequency carriers with the access network subsystem of the wireless network during the measurement gap time period.

14. The wireless communication device recited in claim 9, wherein the indication to the access network subsystem of the wireless circuitry in the wireless communication device comprises at least a number of radio frequency receive signal chains included in the wireless circuitry.

15. The wireless communication device recited in claim 9, wherein the wireless circuitry comprises a plurality of receive signal chains including the first receive signal chain, and wherein the plurality of receive signal chains are configurable to receive signals simultaneously using carrier aggregation from the access network subsystem of the wireless network according to a long term evolution (LTE) wireless communication protocol.

16. The wireless communication device recited in claim 15, wherein the plurality of receive signal chains are further configurable to receive signals simultaneously from a plurality of access network subsystems other than the access network subsystem of the wireless network during the measurement gap time period.

17. The wireless communication device recited in claim 16, wherein the plurality of receive signal chains are further configurable to receive signals simultaneously from at least one access network subsystem other than the access network subsystem of the wireless network and from the access network subsystem of the wireless network during the measurement gap time period.

18. A computer program product encoded as computer program code in a non-transitory computer readable medium for configuring wireless circuitry in a wireless communication device connected to a wireless network, the computer program product comprising:

computer program code for establishing a connection to a access network subsystem of the wireless network;

computer program code for providing information about wireless circuitry included in the wireless communication device to the access network subsystem of the wireless network;

computer program code for obtaining a measurement gap configuration from the access network subsystem of the wireless network, wherein the measurement gap configuration indicates the wireless communication device is to suspend data communication on all carriers through all radio sectors associated with the wireless communication device during a measurement gap time period;

computer program code for stopping downlink and uplink data communication during the measurement gap time period;

computer program code for measuring a set of signals from a plurality of downlink carriers; and computer program code for providing a measurement report to the access network subsystem based at least in part on the set of signals measured during the measurement gap time period.

* * * * *